Figure 1:
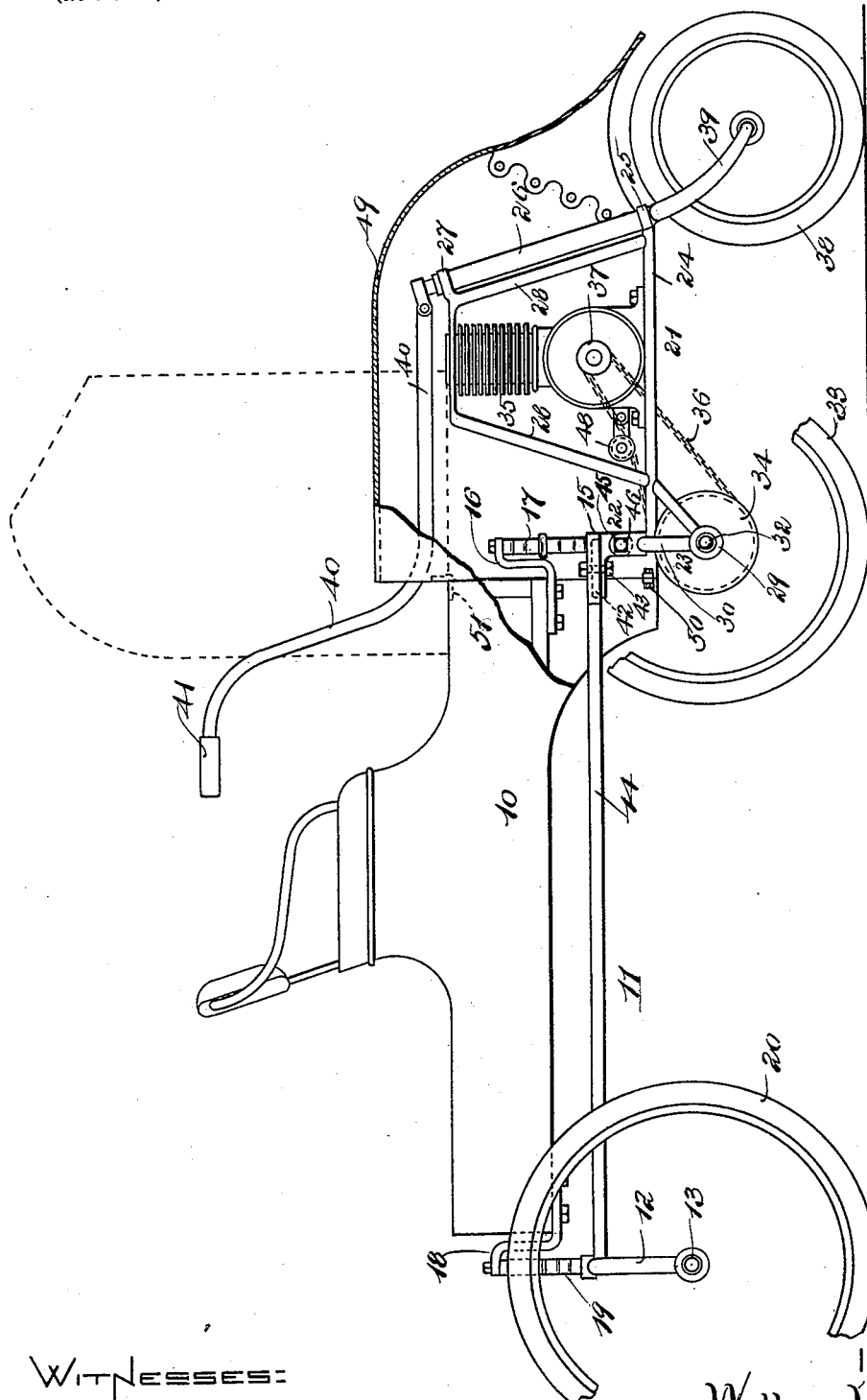

No. 698,836. Patented Apr. 29, 1902.
W. L. HIGHT.
MOTOR VEHICLE.
(Application filed July 27, 1901.)
(No Model.) 3 Sheets—Sheet 1.

No. 698,836. Patented Apr. 29, 1902.
W. L. HIGHT.
MOTOR VEHICLE.
(Application filed July 27, 1901.)
(No Model.) 3 Sheets—Sheet 2.

WITNESSES: INVENTOR:
Wallace L. Hight
by his Attorney

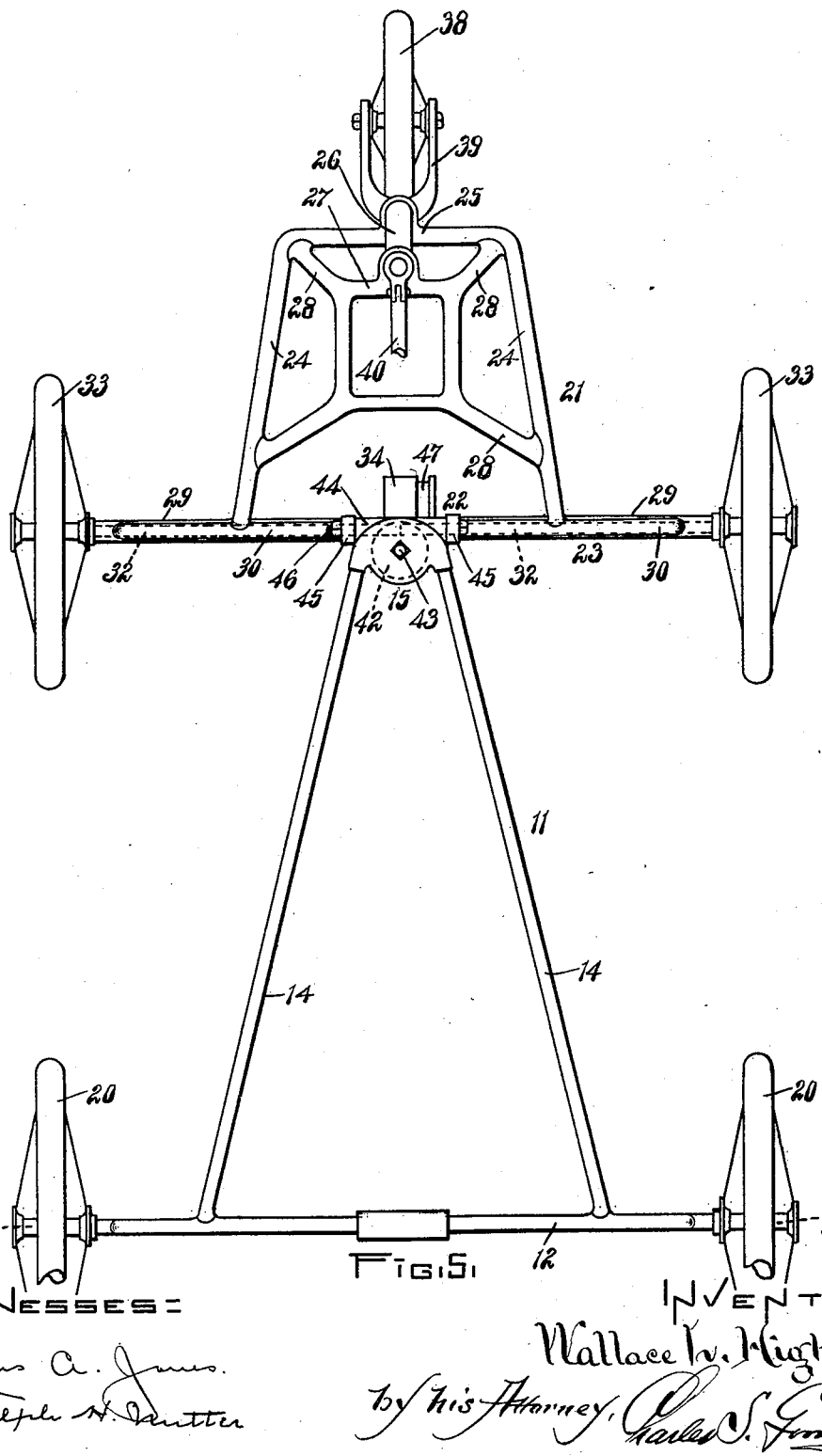

UNITED STATES PATENT OFFICE.

WALLACE L. HIGHT, OF BOSTON, MASSACHUSETTS.

MOTOR-VEHICLE.

SPECIFICATION forming part of Letters Patent No. 698,836, dated April 29, 1902.

Application filed July 27, 1901. Serial No. 69,898. (No model.)

*To all whom it may concern:*

Be it known that I, WALLACE L. HIGHT, a citizen of the United States, residing at Boston, in the county of Suffolk and State of Massachusetts, have invented new and useful Improvements in Motor-Vehicles, of which the following is a specification.

The object of this invention is to produce a neat, compact, and practical motor-vehicle in which the motor is preferably supported upon a steering-frame and the body of the vehicle upon a main frame, so that the motive power may be located in front of the body and main frame of the vehicle and power applied from said motor to the front axle, and thus remove the objectionable vibration caused by the motor in vehicles as at present constructed, where the motive power is applied to the rear axle and the motor and connecting mechanism is supported upon the rear axle and on the body of the vehicle, the whole construction forming a neat, compact, and comfortable vehicle.

The invention consists in a motor-vehicle having a main frame and a steering-frame pivotally connected to each other in such a manner that they may assume varying angles with relation to each other in both a horizontal and a vertical plane.

The invention further consists in a main frame and a steering-frame pivotally connected by a third frame, said third or connecting frame attached to said main frame by a vertical pivotal bolt and to said steering-frame by a horizontal pivotal bolt.

The invention still further consists in a motor-vehicle having a main frame and a steering-frame pivotally connected together, a pair of wheels arranged to rotate upon bearings fast to said main frame, a rotary axle arranged to rotate in bearings fast to said steering-frame, and a pair of wheels fast to said rotary axle, together with a steering-wheel arranged to rotate in bearings in a swivel-frame, said swivel-frame arranged to swivel in bearings upon said supporting-frame.

The invention further consists in a main frame and a steering-frame pivotally connected to each other in such a manner that they may assume varying angles with relation to each other in both a horizontal plane and a vertical plane, in combination with a motor supported upon said steering-frame and operatively connected to a rotary shaft arranged to rotate in bearings upon said steering-frame and having two wheels affixed thereto.

The invention still further consists in the combination and arrangement of parts set forth in the following specification and particularly pointed out in the claims thereof.

Figure 2:
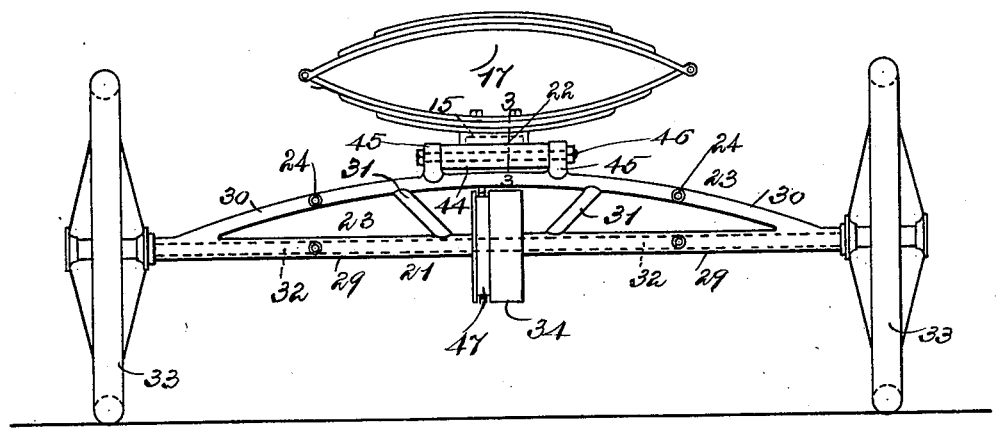
Figure 3:
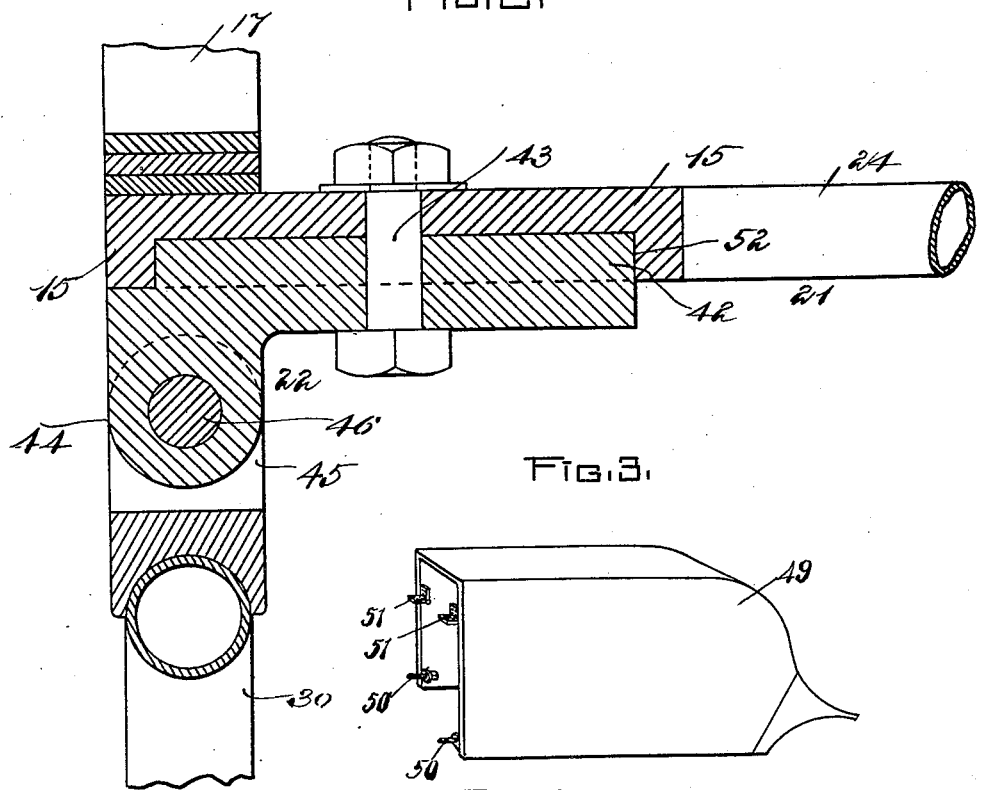
Figure 4:
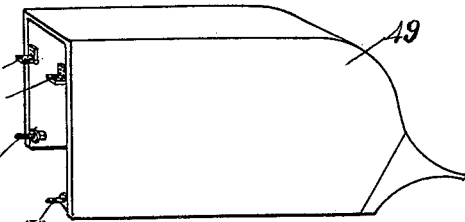

Referring to the drawings, Figure 1 is a side elevation, partly broken away and shown in section, of my improved motor-vehicle. Fig. 2 is a detail front elevation of the pair of front wheels, a portion of the steering-frame, the connecting-frame attached thereto, and an elliptic spring supported upon said connecting-frame. Fig. 3 is an enlarged vertical section taken on line 3 3 of Fig. 2. Fig. 4 is a plan view in detail of the main frame and steering-frame. Fig. 5 is a perspective view of the hood which is attached to the front of the body of the vehicle and covers the motor and connecting mechanism.

Like numerals refer to like parts throughout the several views of the drawings.

In the drawings, 10 is the body of my improved motor-vehicle.

11 is the main frame, consisting of the rear arched axle 12, having two axle-bearings 13 13 thereon, said rear arched axle 12 being connected by reaches 14 to a swivel-plate 15. The body 10 is supported at the front thereof on a bracket 16, fast to the top of an elliptic spring 17, said elliptic spring being in turn fastened to the swivel-plate 15. The rear end of the body 10 is supported upon brackets 18, fast to the top of the elliptic spring 19, said elliptic spring being fastened to the arched rear axle 12.

Each of the axle-bearings 13 is provided with a wheel 20, arranged to rotate thereon.

The main frame 11 is pivotally connected to a steering-frame 21 by a connecting-frame 22 in such a manner that said main frame and steering-frame may assume varying angles with relation to each other in a horizontal and in a vertical plane. The steering-frame 21 consists of an axle-frame 23, joined by reaches 24 to a cross-bar 25, said cross-bar being rigidly fastened to a tubular bearing 26. The tubular bearing 26 has a second cross-bar 27 fast to the upper end thereof and connected by a motor-framework formed of tubing 28 28 28 to the reaches 24.

The axle-frame 23 consists of two horizontal tubes 29 29, joined together by an arched tube 30, said tubes 30 and 29 being strengthened and joined together by braces 31 31. The horizontal tubes 29 29 provide bearings for the rotary shaft 32, said rotary shaft being in two parts and each having at the outer end thereof a wheel 33 fast thereto. The two parts of the rotary shaft 32 are operatively connected to each other by a compensating gear and pulley 34 of any desirable construction well known to those skilled in this art and forming no part of the present invention.

A motor 35 of any desired construction is supported upon the reaches 24 of the steering-frame 21 and is held in position by the motor-framework 28. Said motor is connected by a sprocket-chain or belt 36 to compensating gear and pulley 34, and rotary motion is imparted to the shaft 32 and to the wheels 33 from the motor gear or pulley 37 through said chain 36 and compensating gear 34.

A steering-wheel 38 supports the front end of the steering-frame 21 and is arranged to rotate in bearings upon the forked swivel-frame 39, said frame 39 being arranged to swivel in bearings upon the tube 26. To the outer end of the forked frame 39 is fastened an arm 40, provided with a handle 41, by means of which the driver of the vehicle controls the steering-wheel.

The connecting-frame 22 has preferably a cylindrical bearing-plate 42, which fits into a corresponding recess 52 in the under side of the swivel-plate 15. Said connecting-frame and swivel-plate 15 are joined together by a vertical pivotal king-bolt 43, so that said connecting-frame and swivel-plate may assume different angles with relation to each other in a horizontal plane. Upon the under side of the swivel-plate 15 is a lug 44, which projects downwardly from said swivel-plate and is held between two ears 45 45, fast to the arched tube 30, by a horizontal pivotal bolt 46, which passes through the said ears 45 and through the lug 44, forming a horizontal pivot for the connecting-frame 22, whereby said connecting-frame is adapted to assume different angles in a vertical plane with relation to the axle-frame 23 and the steering-frame 21.

The belt or chain 36 when the motor-vehicle is at a standstill is arranged to travel loosely in a groove 47 in the compensating pulley 34 and is tightened so as to rotate said pulley by an idler 48, which bears against said chain 36, and is operated by the driver to tighten the chain by means of a lever when it is desired to propel the carriage by a lever. (Not shown in the drawings.)

The motor mechanism and steering-gear are entirely covered by a hood 49, which forms an artistic and practical continuation of the body 40, being joined to said body by bolts 50 and a hinge 51. When it is desired to repair or examine the motor and its connecting mechanism, the bolts 50 are removed and the hood 49 turned upon the hinges 51 to the position shown in dotted lines. The front portion of the hood 49, which projects over the frame 39 and steering-wheel 38, is made of flexible material in order that the same may yield if by any accidental change in the angles of the steering-frame and main frame to each other said steering-wheel should be raised sufficiently high with relation to the body of the carriage and the hood to come in contact with said front portion.

The operation of the motor-vehicle is as follows: The motor having been started to rotate the gear 37 and the idler 48 having been operated to tighten the chain 36, said chain 36 will rotate the compensating gear 34, and through said compensating gear 34 the rotary shaft 32 and the front wheels 33 will be rotated, propelling the vehicle. The operator steers the vehicle by means of the handle 41 and arm 40, turning the forks 39 and steering-wheel 38, and as said steering-wheel is turned at different angles it will turn the steering-frame 21 upon the vertical king-bolt 43, thus guiding the carriage as desired. If the surface of the ground at the point where the front wheels contact therewith should be higher or lower than the surface of the ground at the points where the steering-wheel and rear wheels contact therewith, the main frame and steering-frame will assume different angles with relation to each other by swinging upon the horizontal pivotal bolt 46 sufficient to allow all five wheels to contact with the ground at all times and under all variations of surface. If it were not for this horizontal pivot 46, it is evident that at times the steering-wheel 38 and the rear wheels 20 would be in contact with the ground and the front wheels 33 would not be touching the surface of the ground, and hence the vehicle could not be propelled, as said front wheels 33 are the driving-wheels of the vehicle. At other times if the surface of the ground between the steering-wheel and the rear wheels was higher than at the point where said wheels contact therewith the steering-wheel would be lifted from the ground by the front wheels.

It will be seen that by placing the motor upon the steering-frame 21 the vibration communicated to the body of the vehicle will be very much less than where the motor is directly supported upon the rear axle and connected directly to the body. It will also be seen that as the motor and the front driving-wheels are both supported upon the same framework 21 the power will be transmitted in a practical manner from the motor-gear 37 to the compensating gear 34, said gears always maintaining the same relation to each other.

It is evident that the swivel-frame 39 may be attached to the connecting-frame 22 by a horizontal pivotal bolt and that the connecting-frame 22 may be attached to the axle-frame 23, and hence to the steering-frame 21, by a vertical bolt without departing from the spirit of my invention.

Having thus described my invention, what I claim, and desire by Letters Patent to secure, is—

1. In a motor-vehicle, a main frame, a steering-frame, and a connecting-frame, a vertical pivotal bolt attaching said main frame to said connecting-frame, a horizontal pivotal bolt attaching said connecting-frame to said steering-frame, a pair of wheels arranged to rotate upon axle-bearings fast to said main frame, a rotary axle arranged to rotate in bearings fast to said steering-frame, a pair of wheels fast to said rotary axle, and a steering-wheel arranged to rotate in bearings in a swivel-frame, said swivel-frame arranged to swivel in bearings upon said steering-frame.

2. In a motor-vehicle, a main frame, a steering-frame, and a connecting-frame, a vertical pivotal bolt attaching said main frame to said connecting-frame, a horizontal pivotal bolt attaching said connecting-frame to said steering-frame, a pair of wheels arranged to rotate upon axle-bearings fast to said main frame, a rotary axle arranged to rotate in bearings fast to said steering-frame, a pair of wheels fast to said rotary axle, and a steering-wheel arranged to rotate in bearings in a swivel-frame, said swivel-frame arranged to swivel in bearings upon said steering-frame, in combination with a motor fast to said steering-frame and operatively connected to said rotary axle.

3. In a motor-vehicle, a main frame, a body supported thereon, a steering-frame pivotally connected to said main frame in such a manner that said frames may assume varying angles with relation to each other in a horizontal and in a vertical plane, a motor supported upon said steering-frame, and a hood attached to said body and forming a covering for said motor and steering-frame.

4. In a motor-vehicle, a main frame, a body supported thereon, a steering-frame pivotally connected to said main frame in such a manner that said frames may assume varying angles with relation to each other in a horizontal and in a vertical plane, a motor supported upon said steering-frame, and a hood having a flexible front attached to said body and forming a covering for said motor and steering-frame.

In testimony whereof I have hereunto set my hand in presence of two subscribing witnesses.

WALLACE L. HIGHT.

Witnesses:
CHARLES S. GOODING,
WILLIAM M. PACKARD.